US012479361B2

(12) United States Patent
Shibata et al.

(10) Patent No.: US 12,479,361 B2
(45) Date of Patent: Nov. 25, 2025

(54) PROXIMITY ALARM DEVICE

(71) Applicant: DENSO ELECTRONICS CORPORATION, Anjo (JP)

(72) Inventors: Yoshiki Shibata, Anjo (JP); Shuhei Sagawa, Anjo (JP); Yusuke Takeuchi, Anjo (JP)

(73) Assignee: DENSO ELECTRONICS CORPORATION, Anjo (JP)

( * ) Notice: Subject to any disclaimer, the term of this patent is extended or adjusted under 35 U.S.C. 154(b) by 43 days.

(21) Appl. No.: 18/650,741

(22) Filed: Apr. 30, 2024

(65) Prior Publication Data

US 2024/0286548 A1  Aug. 29, 2024

Related U.S. Application Data

(63) Continuation of application No. PCT/JP2022/038524, filed on Oct. 17, 2022.

(30) Foreign Application Priority Data

Nov. 24, 2021  (JP) .................... 2021-190411

(51) Int. Cl.
*B60Q 5/00* (2006.01)
*G10K 9/12* (2006.01)
*G10K 9/22* (2006.01)

(52) U.S. Cl.
CPC ............. *B60Q 5/008* (2013.01); *G10K 9/12* (2013.01); *G10K 9/22* (2013.01)

(58) Field of Classification Search
CPC ............ B60Q 5/008; G10K 9/12; G10K 9/22

USPC ....................................... 340/384.1
See application file for complete search history.

(56) References Cited

U.S. PATENT DOCUMENTS

| 2010/0073829 | A1* | 3/2010 | Baxter | G08B 17/06 340/384.1 |
| 2016/0068102 | A1* | 3/2016 | Tsuzuki | B60C 5/008 340/939 |
| 2017/0151907 | A1* | 6/2017 | Sakamoto | G10K 15/02 |
| 2019/0122082 | A1* | 4/2019 | Cuban | G06T 7/73 |
| 2021/0300242 | A1* | 9/2021 | Konno | H04R 5/04 |

FOREIGN PATENT DOCUMENTS

| JP | 2013126781 A | 6/2013 |
| JP | 2013239881 A | 11/2013 |
| JP | 2015080992 A | 4/2015 |
| JP | 2017095060 A | 6/2017 |
| WO | WO-2014184829 A1 | 11/2014 |

* cited by examiner

*Primary Examiner* — Kerri L McNally
(74) *Attorney, Agent, or Firm* — Harness, Dickey & Pierce, P.L.C.

(57) ABSTRACT

A proximity alarm device includes a microcomputer, a speaker, an electric board, and a board temperature sensor housed in a housing of the proximity alarm device. The board temperature sensor is mounted on a sensor mounting surface of the electric board, and outputs board temperature information indicating the detected board temperature to the microcomputer. An arithmetic unit of the microcomputer estimates and calculates the speaker temperature based on the board temperature information, and a correcting unit corrects the approach notification sound based on the estimated and calculated speaker temperature.

6 Claims, 7 Drawing Sheets

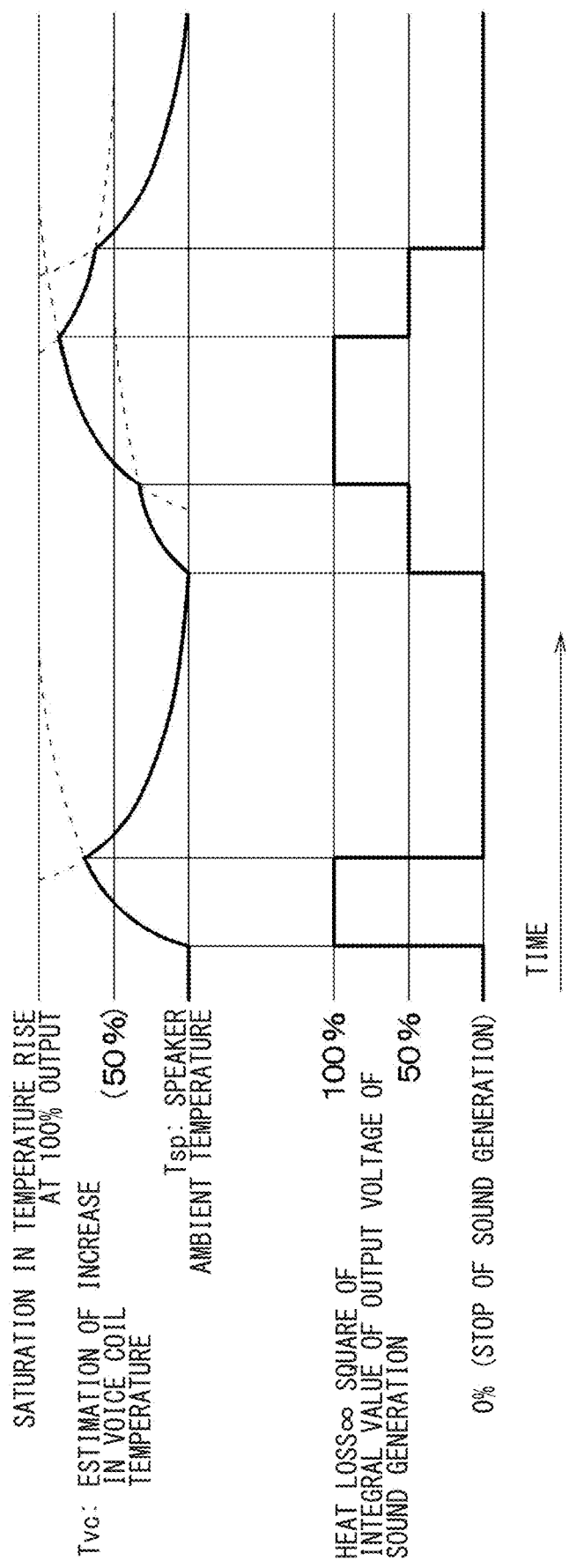

PROXIMITY ALARM DEVICE

CROSS REFERENCE TO RELATED APPLICATION

The present application is a continuation application of International Patent Application No. PCT/JP2022/038524 filed on Oct. 17, 2022, which designated the U.S. and claims the benefit of priority from Japanese Patent Application No. 2021-190411 filed on Nov. 24, 2021. The entire disclosures of all of the above applications are incorporated herein by reference.

TECHNICAL FIELD

The present disclosure relates to a proximity alarm device that emits an approach notification sound for notifying an approach of a vehicle.

BACKGROUND

In an electric vehicle, a hybrid vehicle, or the like, noise generated by the vehicle is small due to its structure, and it is difficult for a pedestrian to notice the approach of these vehicles. For this reason, in recent years, in order to increase recognition that a vehicle is near a pedestrian or the like, a proximity alarm device is mounted on an electric vehicle, a hybrid vehicle, or the like so as to emit a pseudo traveling sound as an approach notification sound.

SUMMARY

According to one aspect of the present disclosure, a proximity alarm device that emits an approach notification sound for notifying an approach of a vehicle includes: a microcomputer having a memory unit storing approach notification sound data which is a basis of an approach notification sound, the microcomputer performing output based on the approach notification sound data; a sounding body that emits an approach notification sound based on an output from the microcomputer; an electric board on which the microcomputer is mounted; a board temperature sensor mounted on a sensor mounting surface of the electric board to detect a board temperature which is a temperature on the sensor mounting surface and output board temperature information indicating the board temperature to the microcomputer; and a housing in which the microcomputer, the sounding body, the electric board, and the board temperature sensor are housed. In addition to the memory unit, the microcomputer further includes an arithmetic unit that estimates and calculates a sounding body temperature, which is a temperature of the sounding body, based on the board temperature information, and a correcting unit that corrects the approach notification sound based on the sounding body temperature estimated and calculated by the arithmetic unit.

BRIEF DESCRIPTION OF THE DRAWINGS

FIG. 8 is a diagram illustrating a temperature change of a voice coil with respect to a sound output in the first embodiment.

DETAILED DESCRIPTION

Figure 1:
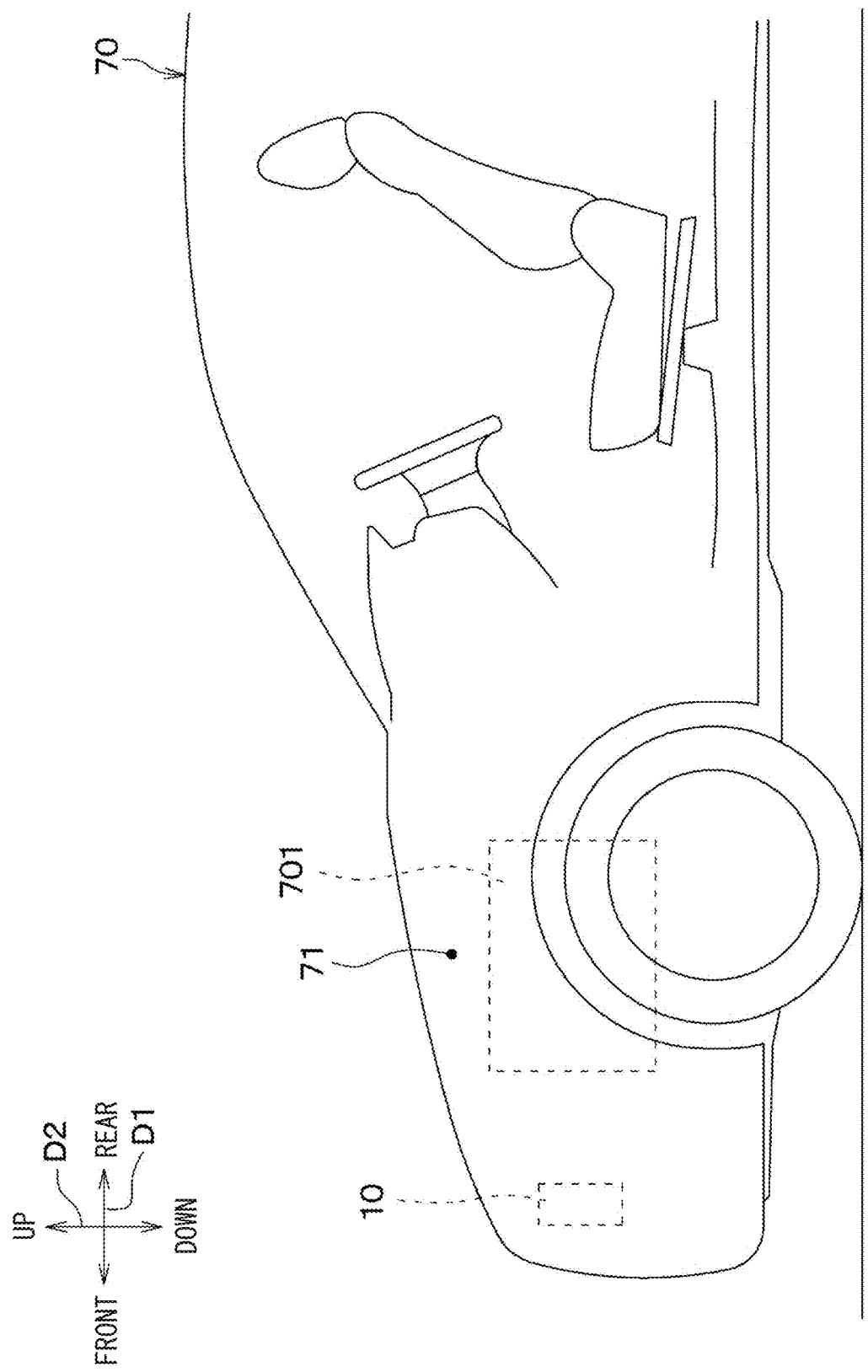
FIG. 1 is a diagram schematically illustrating a state in which a proximity alarm device is mounted on a vehicle in a first embodiment.

In an electric vehicle, a hybrid vehicle, or the like, noise generated by the vehicle is small due to its structure, and it is difficult for a pedestrian to notice the approach of these vehicles. For this reason, in recent years, in order to increase recognition that a vehicle is near a pedestrian or the like, a proximity alarm device is mounted on an electric vehicle, a hybrid vehicle, or the like so as to emit a pseudo traveling sound as an approach notification sound.

As such a proximity alarm device, a vehicle proximity alarm device is known. In the vehicle proximity alarm device, an approach notification sound such as a pseudo traveling sound is emitted from a speaker based on an output from a microcomputer.

In the microcomputer, the speaker temperature is estimated from the outside air temperature, the engine water temperature, the engine oil temperature, and the vehicle speed detected by the various sensors, and the approach notification sound is corrected based on the estimated speaker temperature.

A proximity alarm device that emits an approach notification sound, such as the vehicle proximity alarm device, is assumed to be disposed, for example, in an engine room of a vehicle. When the proximity alarm device is disposed in the engine room, since the temperature change in the engine room is severe, the speaker temperature in the proximity alarm device also greatly fluctuates. In this case, the change in the output characteristic of the speaker due to the fluctuation in the speaker temperature also becomes large. Therefore, when the approach notification sound is emitted from the proximity alarm device without taking into account the change in the output characteristic of the speaker, the approach notification sound may sound smaller or larger than the desired sound.

In order to avoid such a situation, in the vehicle proximity alarm device, the speaker temperature is estimated, and the approach notification sound is corrected based on the estimated speaker temperature.

However, in the vehicle proximity alarm device, the temperature detected in the vicinity of the speaker is not used to estimate the speaker temperature. Therefore, it is difficult to estimate the speaker temperature with high accuracy. When the estimation accuracy of the speaker temperature deteriorates, the correction accuracy of the approach notification sound also deteriorates accordingly. The above has been found as a result of detailed studies by the inventors. The speaker is also referred to as a sounding body, and the speaker temperature is also referred to as a temperature of sounding body.

The present disclosure provides a proximity alarm device capable of improving estimation accuracy of a temperature of sounding body serving as a basis for correcting an approach notification sound.

According to one aspect of the present disclosure, a proximity alarm device that emits an approach notification sound for notifying an approach of a vehicle includes: a microcomputer having a memory unit storing approach notification sound data which is a basis of an approach notification sound, the microcomputer performing output based on the approach notification sound data; a sounding body that emits an approach notification sound based on an output from the microcomputer; an electric board on which the microcomputer is mounted; a board temperature sensor mounted on a sensor mounting surface of the electric board to detect a board temperature which is a temperature on the sensor mounting surface and output board temperature information indicating the board temperature to the microcomputer; and a housing in which the microcomputer, the sounding body, the electric board, and the board temperature sensor are housed. In addition to the memory unit, the microcomputer further includes an arithmetic unit that estimates and calculates a sounding body temperature, which is a temperature of the sounding body, based on the board temperature information, and a correcting unit that corrects the approach notification sound based on the sounding body temperature estimated and calculated by the arithmetic unit.

In this way, the board temperature sensor that detects the board temperature for estimating and calculating the temperature of the sound emitting body can be disposed in the space in the housing, which is the same space as the sound emitting body, and can be disposed in the vicinity of the sound emitting body. Therefore, it is possible to improve the estimation accuracy of the sounding body temperature in comparison with, for example, the vehicle proximity alarm device.

In addition, since the board temperature sensor is mounted on the electric board on which the microcomputer is mounted, electric wiring for connecting the board temperature sensor and the electric board on which the microcomputer is mounted is unnecessary. Therefore, as compared with case where the detection signal of the board temperature sensor is input to the microcomputer via an electrical wiring, the electrical resistance between the board temperature sensor and the microcomputer can be significantly reduced, and the detection signal of the board temperature sensor can be accurately input to the microcomputer. Also from this point, it is possible to improve the estimation accuracy of the sounding body temperature.

The reference numerals attached to the components and the like indicate an example of correspondence between the components and the like and specific components and the like in embodiments to be described below.

Embodiments will now be described with reference to the drawings. In the following embodiments, the same or equivalent parts are denoted by the same reference numerals as each other, and explanations will be provided to the same reference numerals.

First Embodiment

As shown in FIG. 1, a proximity alarm device 10 of the present embodiment is mounted on a vehicle 70 such as a hybrid vehicle. Specifically, the proximity alarm device 10 is disposed in an engine room 71 provided in a front portion of the vehicle 70. The proximity alarm device 10 emits a pseudo traveling sound as an approach notification sound during low-speed traveling in which road noise is small, thereby notifying surrounding pedestrians and the like of the approach of the vehicle 70. In other words, the engine room 71 is a power source chamber in which an engine or the like as the traveling power source 701 of the vehicle 70 is housed. Arrows D1 and D2 in FIG. 1 represent directions with respect to the vehicle 70 on which the proximity alarm device 10 is mounted.

Figure 2:
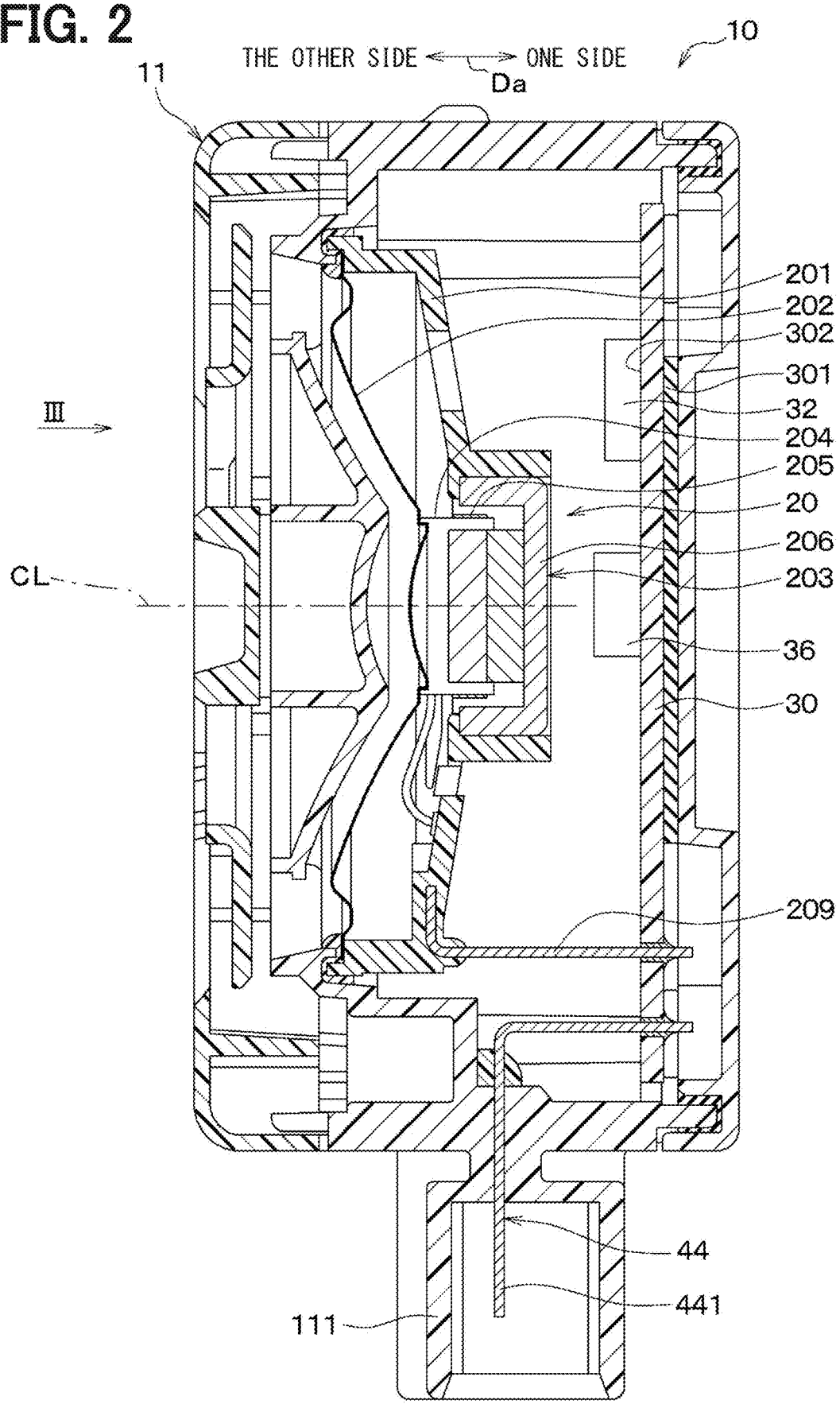
FIG. 2 is a sectional view illustrating a schematic configuration of the proximity alarm device according to the first embodiment.
Figure 3:
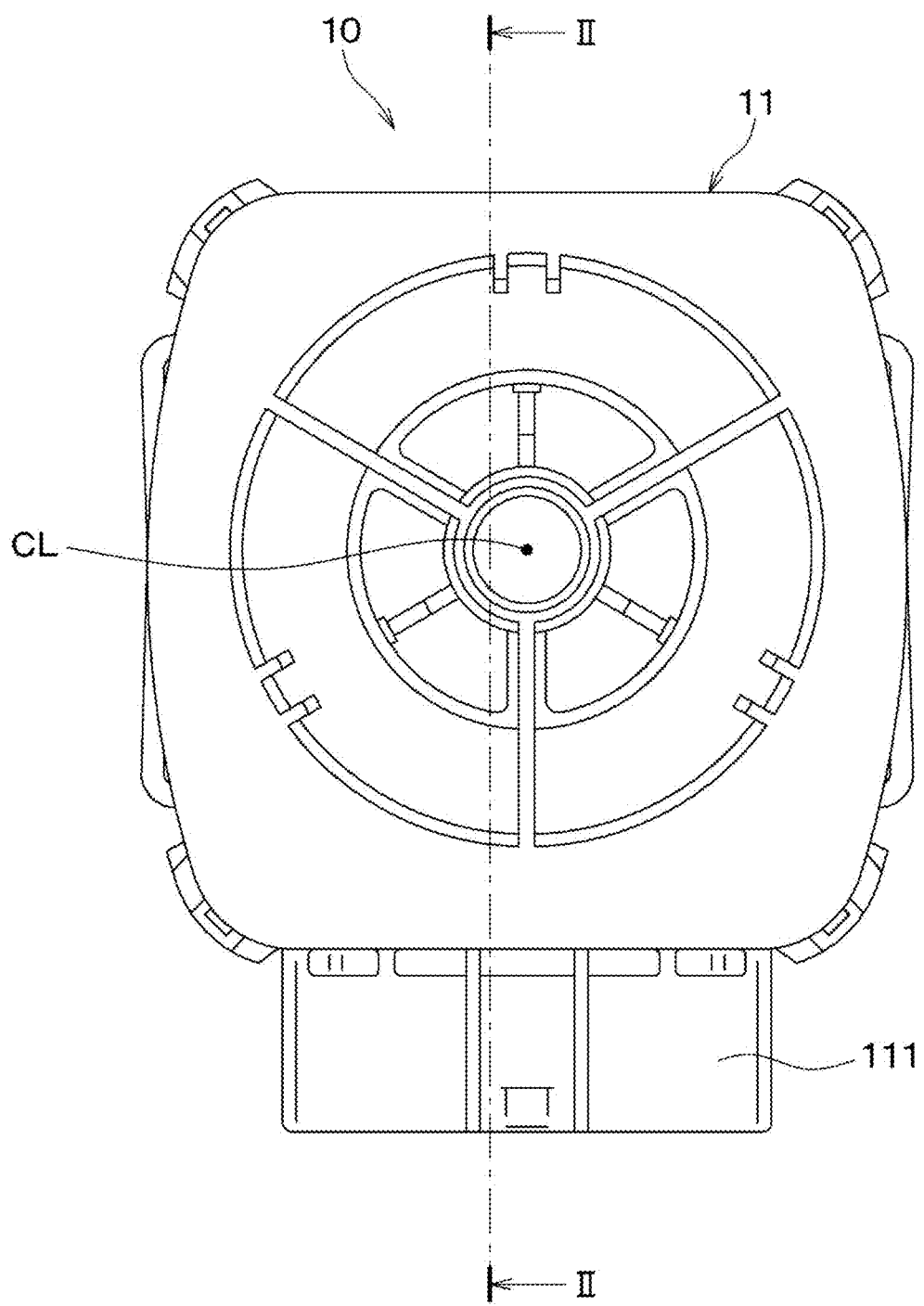
FIG. 3 is a front view of the proximity alarm device according to the first embodiment, as viewed in an arrow direction III of FIG. 2.
Figure 4:
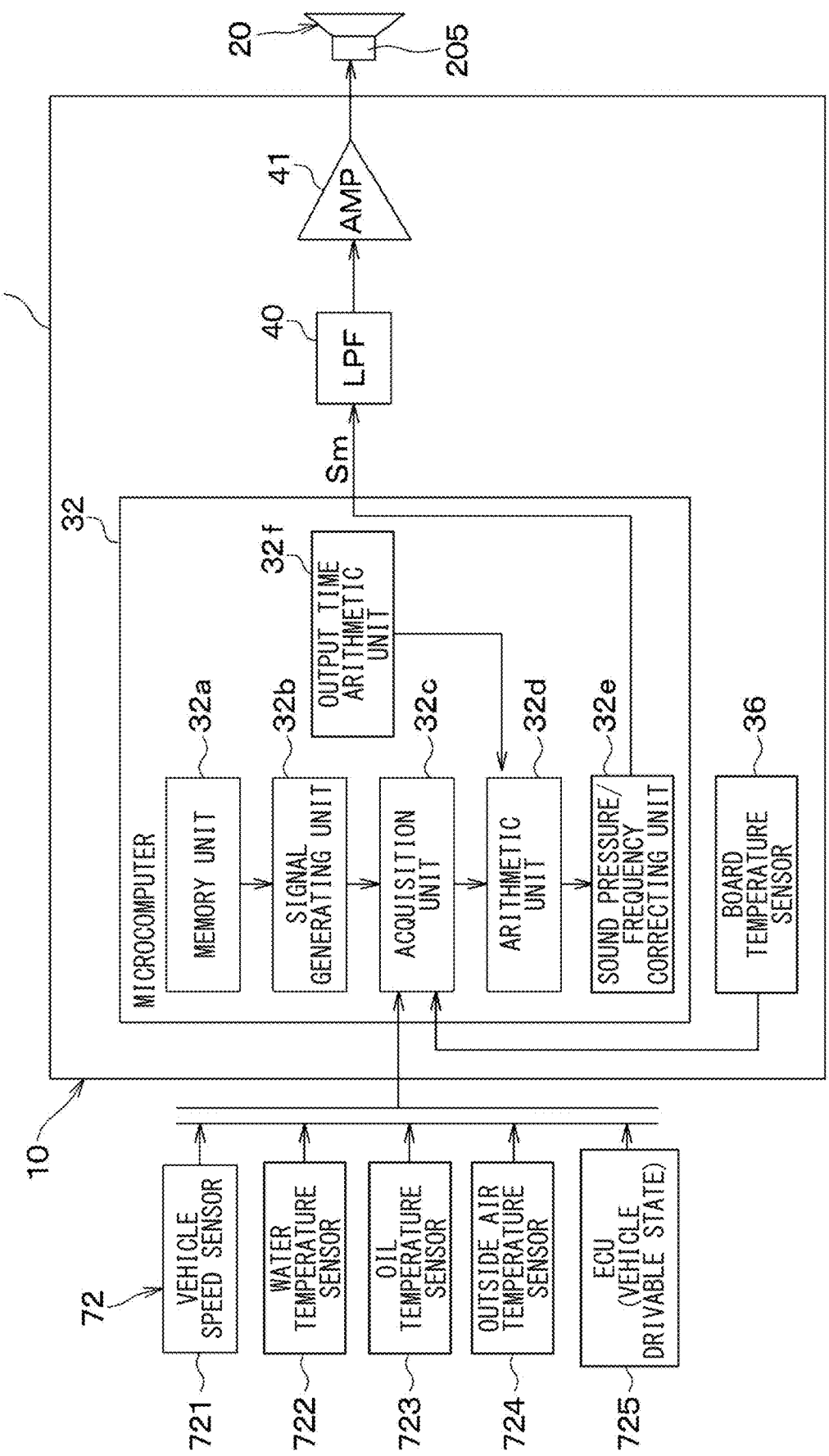
FIG. 4 is a block diagram of the proximity alarm device according to the first embodiment.

As shown in FIGS. 2 to 4, the proximity alarm device 10 includes a housing 11 in which a space is formed, a speaker 20 which is a sounding body, an electric board 30, a microcomputer 32, a board temperature sensor 36, a low-pass filter 40, and a power amplifier 41. In the description of the present embodiment, the power amplifier 41 may be abbreviated as an amplifier 41. In FIG. 4, "LPF" is an abbreviation for a low-pass filter, and "AMP" is an abbreviation for an amplifier.

The housing 11 forms an outer shell of the proximity alarm device 10, and is configured by integrating, for example, plural resin components. The speaker 20, the electric board 30, the microcomputer 32, the board temperature sensor 36, the low-pass filter 40, and the amplifier 41 are housed in the housing 11. The speaker 20 and the electric board 30 are fixed to the housing 11.

The housing 11 includes a connector portion 111 for connecting external wiring.

In the housing 11, the electric board 30 is disposed at one side of the speaker 20 in an axial direction Da of the speaker axis CL, which is the center line of the speaker 20. In the description of the present embodiment, the axial direction Da of the speaker axis CL may be referred to as a speaker axial direction Da. The side opposite to the one side in the speaker axial direction Da is referred to as the other side in the speaker axial direction Da. The speaker axis CL corresponds to one axis of the present disclosure.

The electric board 30 has a plate shape that spreads in a direction intersecting the speaker axial direction Da (strictly speaking, a direction perpendicular to the speaker axial direction Da). The electric board 30 has one surface 301 and the other surface 302 as mounting surface on which electric components such as resistors and capacitors are mounted. The electric board 30 is a printed circuit board, and wiring patterns are formed on the one surface 301 and the other surface 302, respectively, to be electrically connected to electric components mounted on the electric board 30.

The one surface 301 of the electric board 30 is provided at one side of the electric board 30 in the speaker axial direction Da, and faces one side in the speaker axial direction Da. The other surface 302 of the electric board 30 is provided at the other side in the speaker axial direction Da of the electric board 30 and faces the other side in the speaker axial direction Da.

The board temperature sensor 36 is mounted on the other surface 302 of the electric board 30. That is, the other surface 302 of the electric board 30 is a sensor mounting surface on which the board temperature sensor 36 is mounted.

The microcomputer 32 is mounted on the other surface 302 of the electric board 30, and the low-pass filter 40 and the amplifier 41 are mounted on the one surface 301 or the other surface 302 of the electric board 30.

Plural connector terminals 44, which are metal members, are connected to the electric board 30 by soldering. The connector terminal 44 has a connector side end portion 441 provided on the opposite side of the electric board 30. The connector side end portion 441 is exposed to the outside of the housing 11 at the connector portion 111 of the housing 11. The electric board 30 is electrically connected to an external connection device 72 provided outside the proximity alarm device 10 via the connector terminal 44.

The external connection device 72 includes a vehicle speed sensor 721, a water temperature sensor 722, an oil temperature sensor 723, an outside air temperature sensor 724, an electronic control unit 725 for engine control (hereinafter, referred to as an engine ECU 725), and a vehicle power supply (for example, a battery), which is not illustrated.

The speaker 20 is a device that emits an approach notification sound based on an output from the microcomputer 32. Specifically, the speaker 20 emits the approach notification sound at a frequency and a sound pressure level corresponding to the approach notification sound voltage waveform signal Sm transmitted through the amplifier 41. In the description of the present embodiment, the approach notification sound voltage waveform signal Sm may be referred to as a sound generation signal Sm.

As shown in FIGS. 2 and 3, the speaker 20 includes a frame 201, a diaphragm 202, a drive unit 203, and plural terminal fittings 209. The speaker 20 is disposed so as to emit an approach notification sound toward the other side in the speaker axial direction Da. Therefore, the wall of the housing 11 is partially opened at a position of the housing 11 that overlaps the speaker 20 at the other side of the housing 11 in the speaker axial direction Da. FIG. 2 is a cross-sectional view taken along line II-II of FIG. 3.

As shown in FIG. 2, the frame 201 supports the diaphragm 202 and the drive unit 203, and is fixed to the housing 11 by, for example, an adhesive at an outer peripheral portion of the frame 201. That is, the diaphragm 202 and the drive unit 203 of the speaker 20 are supported by the housing 11 via the frame 201. The frame 201 is made of resin, for example.

The diaphragm 202 of the speaker 20 is formed in a film shape spreading in a direction intersecting the speaker axial center CL and has a center corresponding to the speaker axial center CL. The diaphragm 202 has flexibility and is made of, for example, cone paper. The diaphragm 202 generates, for example, air vibration that becomes an approach notification sound by the vibration of the diaphragm 202 itself. The diaphragm 202 is referred to as a diaphragm.

The drive unit 203 of the speaker 20 is configured to vibrate the diaphragm 202 to generate sound by being energized. The drive unit 203 is disposed at one side of the diaphragm 202 in the speaker axial direction Da with the speaker axis CL as the center line of the drive unit 203. The drive unit 203 includes a bobbin 204, a voice coil 205, and a magnetic circuit unit 206. In addition, the electric board 30 is disposed at one side in the speaker axial direction Da with respect to the drive unit 203.

The bobbin 204 has a cylindrical shape and is joined to a part of the diaphragm 202. The voice coil 205 is wound around the bobbin 204. The speaker axis CL is also the center line of the voice coil 205.

The magnetic circuit unit 206 applies a magnetic field to the voice coil 205. The magnetic circuit unit 206 includes a yoke, a magnet, and a top plate. The yoke has a bottomed cylindrical shape. The magnet has a disk shape, and is arranged on an inner bottom surface of the yoke. The top plate has a disk shape, and is stacked on the magnet. The yoke and the top plate are made of a magnetic material. The yoke opens toward the diaphragm 202 and is disposed so as to close an opening at one side of the frame 201 in the speaker axial direction Da.

A gap is formed between the magnet and a side wall of the yoke, and a gap is formed between the top plate and a side wall of the yoke. The voice coil 205 is arranged in the gap. Thus, a magnetic field generated between the top plate and the side wall of the yoke is applied to the voice coil 205. When a current flows through the voice coil 205 in this state, the bobbin 204 is displaced in the speaker axial direction Da, and the diaphragm 202 vibrates, such that sound is generated. The current flowing through the voice coil 205 is supplied from the amplifier 41 in accordance with an output signal from the microcomputer 32.

The terminal fitting 209 of the speaker 20 is a metal component that electrically connects the voice coil 205 of the drive unit 203 and the electric board 30. That is, the current supplied from the amplifier 41 flows to the voice coil 205 via the terminal fitting 209.

The terminal fitting 209 is fixed to the frame 201 and protrudes from the frame 201 toward one side in the speaker axial direction Da. The protruding distal end of the terminal fitting 209 is connected to the electric board 30 by soldering.

As illustrated in FIG. 4, the vehicle speed sensor 721 detects a vehicle speed and outputs a vehicle speed detection signal indicating the vehicle speed. The vehicle speed detection signal is input to the microcomputer 32 of the proximity alarm device 10 as vehicle speed information indicating the vehicle speed.

The water temperature sensor 722 detects the temperature of the radiator water for cooling the engine, and outputs a water temperature detection signal indicating the temperature of the radiator water. The water temperature detection signal is input to the microcomputer 32 as water temperature information indicating the temperature of the radiator water.

The oil temperature sensor 723 detects the temperature of the engine oil and outputs an oil temperature detection signal indicating the temperature of the engine oil. The oil temperature detection signal is input to the microcomputer 32 as oil temperature information indicating the temperature of the engine oil.

The outside air temperature sensor 724 detects the outside air temperature outside the vehicle compartment and outputs an outside air temperature detection signal indicating the detected outside air temperature. The outside air temperature detection signal is input to the microcomputer 32 as outside air temperature information indicating the outside air temperature.

The vehicle speed, the temperature of the radiator water, the temperature of the engine oil, and the outside air temperature affect the temperature of the engine room 71 in which the proximity alarm device 10 is installed. Therefore, the vehicle speed information, the water temperature information, the oil temperature information, and the outside air temperature information obtained from the sensors 721 to 724 correspond to engine room temperature related information related to the temperature of the engine room 71 (in other words, information related to the temperature of power source chamber).

The engine ECU 725 handles values of various physical quantities used for engine control, and inputs information related to a travelable state of the vehicle 70 and information related to an engine operation time to the microcomputer 32 of the proximity alarm device 10.

As shown in FIGS. 2 and 4, the board temperature sensor 36 is a temperature sensor constituted by, for example, a thermistor, and detects a board temperature which is a temperature on the other surface 302 of the electric board 30. The board temperature may be a temperature of air in contact with the other surface 302 of the electric board 30, or may be a temperature of a portion of the other surface 302 of the electric board 30 where the board temperature sensor 36 is disposed. The board temperature sensor 36 outputs a board temperature detection signal indicating the board temperature, and the board temperature detection signal is input to the microcomputer 32 as board temperature information indicating the board temperature.

In addition, as shown in FIG. 2, the board temperature sensor 36 is disposed to overlap the drive unit 203 of the speaker 20 at one side in the speaker axial direction Da. Specifically, the board temperature sensor 36 is not in contact with the drive unit 203 of the speaker 20, but is disposed adjacent to the drive unit 203 with a gap in the speaker axial direction Da. In short, the board temperature sensor 36 is disposed in the vicinity of the drive unit 203 of the speaker 20, specifically, in the vicinity of the voice coil 205 of the drive unit 203.

In the description of the present embodiment, the sensors 721, 722, 723, and 724 may be abbreviated to the sensors 721 to 724, and the sensors 721, 722, 723, 724, and 36 may be abbreviated to the sensors 721 to 724 and 36.

As shown in FIG. 4, the detection signals of the sensors 721 to 724 and the information from the engine ECU 725 are input to the microcomputer 32 of the proximity alarm device 10 through, for example, an in-vehicle LAN.

The sensors 721 to 724 illustrated in FIG. 4 are mounted on the vehicle 70. That is, the sensors 721 to 724 are not provided only for detecting the temperature of the speaker 20. The temperature of the speaker 20 is a representative temperature of the speaker 20 and is referred to as a speaker temperature. Specifically, in the present embodiment, the temperature Tvc of the voice coil 205 of the speaker 20 is treated as the speaker temperature. This speaker temperature corresponds to the sounding body temperature of the present disclosure. In the description of the present embodiment, the temperature Tvc of the voice coil 205 may be abbreviated as the voice coil temperature Tvc.

The microcomputer 32 is an electronic control unit including one or more electronic components such as an LSI or an IC. The microcomputer 32 executes a computer program stored in a semiconductor memory as a recording medium, and a method corresponding to the computer program is executed by executing the computer program. For example, the microcomputer 32 generates the sound generation signal Sm, which is a voltage waveform signal, based on the approach notification sound data stored in advance, and outputs the sound generation signal Sm.

Specifically, as illustrated in FIG. 4, the microcomputer 32 includes a memory unit 32a, a signal generating unit 32b, an acquisition unit 32c, an arithmetic unit 32d, a sound pressure/frequency correcting unit 32e, and an output time arithmetic unit 32f. The control processing executed by the memory unit 32a, the signal generating unit 32b, the acquisition unit 32c, the arithmetic unit 32d, the sound pressure/frequency correcting unit 32e, and the output time arithmetic unit 32f may be realized by a computer program or may be realized by hardware. In the description of the present embodiment, the sound pressure/frequency correcting unit 32e may be referred to as a correcting unit 32e for short.

The memory unit 32a stores approach notification sound data, various control programs, and the like. The approach notification sound data is data on which the approach notification sound is based, that is, sound source data of the approach notification sound. For example, the memory unit 32a stores approach notification sound data such as PCM data, a control program for sound generation of the approach notification sound of the vehicle 70 including a correction calculation program associated with the speaker temperature, and the like.

The memory unit 32a may be a part of a semiconductor component included in the microcomputer 32, or may be one independent recording medium included in the microcomputer 32.

The signal generating unit 32b generates the sound generation signal Sm for outputting the approach notification sound based on the approach notification sound data stored in the memory unit 32a.

The acquisition unit 32c acquires various types of information from the external connection device 72 and the board temperature sensor 36. The various types of information include, for example, the vehicle speed information, the water temperature information, the oil temperature information, the outside air temperature information, the board temperature information, the information on the travelable state of the vehicle 70, and the information on the engine operating time described above.

Here, the various types of information acquired by the acquisition unit 32c from the external connection device 72 are information that is an external factor of a change in the speaker temperature. That is, when the vehicle speed increases, the wind impingement on the speaker 20 increases, and the speaker temperature may decrease. In addition, the speaker temperature may fluctuate due to the influence of the temperature of a member existing around the speaker 20, such as the temperature of the radiator or the engine. Similarly, the speaker temperature may also vary due to the influence of the outside air temperature. As described above, the acquisition unit 32c acquires values of the parameter of the external factor that can change the speaker temperature by acquiring various types of information from the external connection device 72.

When the information transmitted from the external connection device 72 and the board temperature sensor 36 is various detection signals by the various sensors 721 to 724 and 36, the acquisition unit 32c obtains the vehicle speed, the temperature of the radiator water, the temperature of the engine oil, the outside air temperature, the board temperature, and the like based on the various detection signals.

The arithmetic unit 32d estimates and calculates the speaker temperature based on the various types of information acquired by the acquisition unit 32c and the output time of sound generation in the speaker 20 transmitted from the output time arithmetic unit 32f described later. A method of calculation by the arithmetic unit 32d will be described later.

The correcting unit 32e corrects the approach notification sound based on the speaker temperature estimated and calculated by the arithmetic unit 32d so as to suppress the approach notification sound emitted by the speaker 20 from changing due to a change in the speaker temperature. Specifically, the correcting unit 32e corrects the sound generation signal Sm so as to correct the amplitude of the speaker output sound pressure and the frequency of the sound to be output when the sound is generated from the speaker 20, based on the speaker temperature estimated and calculated by the arithmetic unit 32d.

Then, the correcting unit 32e transmits the sound generation signal Sm of the corrected speaker output sound pressure and frequency to the low-pass filter 40. A method of the correction by the correcting unit 32e will be described later.

The output time arithmetic unit 32f calculates an output time when sound is emitted from the speaker 20, and transmits the output time to the arithmetic unit 32d. The speaker temperature increases according to the output time when sound is generated. Therefore, the output time of the speaker 20 is information that becomes an internal factor of the change in the speaker temperature.

For example, when the vehicle 70 travels and sound is generated from the speaker 20, the output time arithmetic unit 32f integrates the output time until the sound generation is stopped. The integration of the output time by the output time arithmetic unit 32f is performed during the start of the vehicle 70, and is reset when the start of the vehicle 70 is finished. Whether or not the vehicle 70 is being started can be determined based on, for example, the travelable state of the vehicle 70, and the output time arithmetic unit 32f integrates the output time while the vehicle 70 is being started.

The output time arithmetic unit 32f notifies the arithmetic unit 32d of the elapsed time from the stop of the sound generation from the speaker 20 together with the output time. That is, since the speaker temperature decreases when the sound generation from the speaker 20 is stopped, the output time arithmetic unit 32f transmits the elapsed time from the stop of the sound generation to the arithmetic unit 32d. This makes it possible to estimate and calculate the speaker temperature more accurately in consideration of the increase in speaker temperature based on the output time and the decrease in speaker temperature after the sound generation is stopped.

The sound generation signal Sm output from the microcomputer 32 is input to the low-pass filter 40. The low-pass filter 40 removes a high-frequency noise component and generates the sound generation signal Sm from which the noise component has been removed. For example, the low-pass filter 40 stores a voltage corresponding to the output in a built-in capacitor and outputs the voltage to the amplifier 41.

The amplifier 41 supplies a current corresponding to the output of the low-pass filter 40 to the speaker 20 based on voltage application from a constant voltage source (not shown). The sound pressure generated by the speaker 20 is determined in accordance with the magnitude (that is, the amplitude) of the current supplied from the amplifier 41, and the magnitude of the current supplied from the amplifier 41 is determined in accordance with the output waveform of the low-pass filter 40 corresponding to the PWM output. Therefore, the current supplied by the amplifier 41 is changed based on the sound generation signal Sm corrected based on the speaker temperature.

Then, when a current that changes based on the corrected sound generation signal Sm is supplied from the amplifier 41 to the voice coil 205 of the speaker 20, the diaphragm 202 of the speaker 20 vibrates and an approach notification sound is generated.

Next, a correction method in the correcting unit 32e and an estimation calculation method of the speaker temperature by the arithmetic unit 32d will be described.

The correcting unit 32e corrects the voltage level of the sound generation signal Sm according to the speaker temperature. Specifically, as will be described later, the amplitude coefficient k1 of the sound generation signal Sm is calculated. Then, the correcting unit 32e generates the sound generation signal Sm after the sound pressure correction by multiplying the sound generation signal Sm before the sound pressure correction by the calculated amplitude coefficient k1.

Specifically, the correcting unit 32e calculates the amplitude coefficient k1 corresponding to the speaker temperature estimated by the arithmetic unit 32d using the calculation formula or the map stored in the memory unit 32a. That is, the memory unit 32a stores arithmetic formula or map indicating a relationship between a temperature and a sound pressure level within a temperature range assumed as a temperature change of a place where the speaker 20 is mounted. Then, the correcting unit 32e calculates the amplitude coefficient k1 by substituting the speaker temperature into the arithmetic formula, or selects the amplitude coefficient k1 corresponding to the speaker temperature from the map. As for the speaker temperature, the result of the estimation calculation performed by the arithmetic unit 32d is used as described later.

Figure 5:
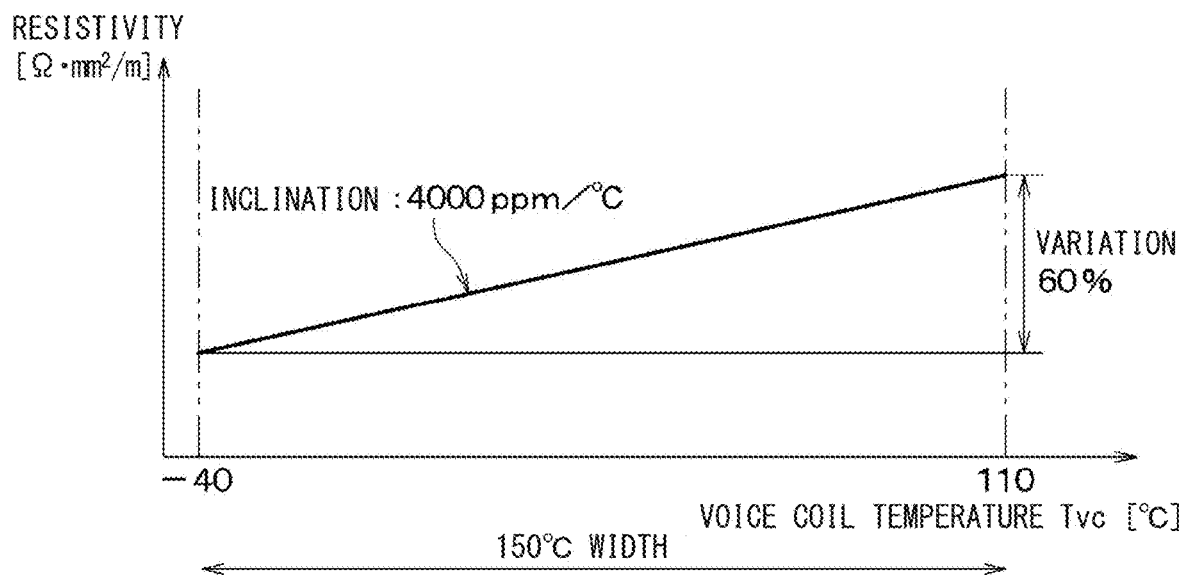
FIG. 5 is a diagram illustrating temperature characteristics of resistivity of a voice coil included in a speaker in the first embodiment.
Figure 6:
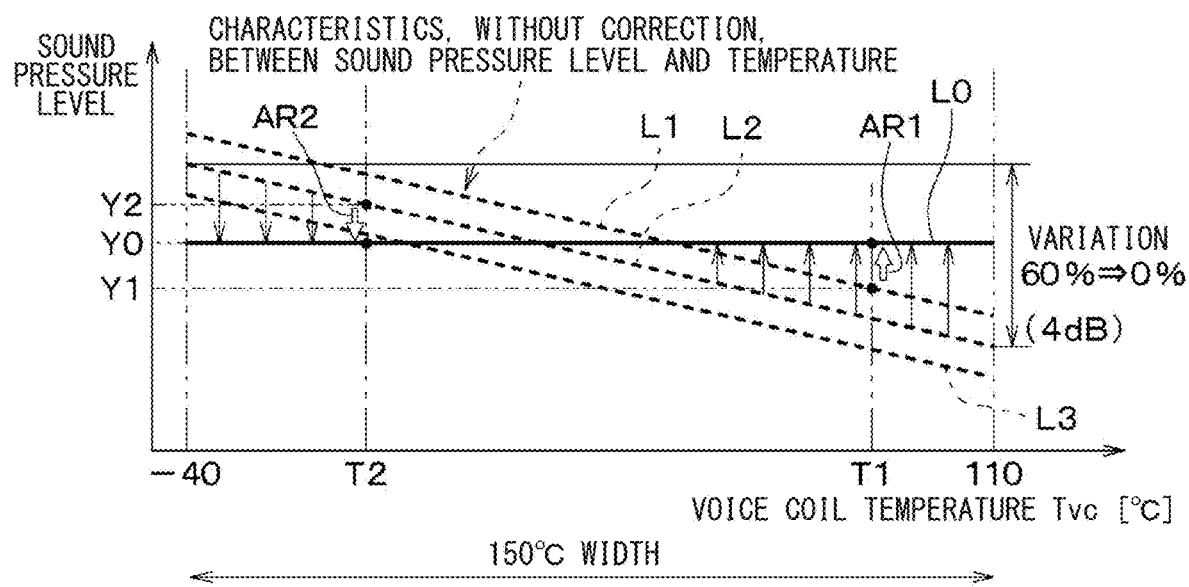
FIG. 6 is a diagram illustrating a sound pressure level temperature characteristic which is a relationship between a voice coil temperature and a sound pressure level in a speaker in the first embodiment.

FIG. 5 is a diagram illustrating temperature characteristics of the resistivity of the voice coil 205 included in the speaker 20. FIG. 6 is a diagram illustrating sound pressure level temperature characteristics which is a relationship between the voice coil temperature Tvc and the sound pressure level in the speaker 20. The dashed line L1, L2, L3 in FIG. 6 indicates the sound pressure level temperature characteristics in a state where the sound pressure correction is not performed, that is, the sound pressure level temperature characteristics when the amplitude coefficient k1 is "k1=1". The dashed lines L1, L2, and L3 respectively show the sound pressure level temperature characteristics of three individual speakers 20.

For example, since the material of the voice coil 205 of the speaker 20 is copper, as shown in FIG. 5, the temperature coefficient of the resistivity of copper is about 4000 ppm/° C. Therefore, the impedance of the voice coil 205 changes by about 60% within 150° C. width from −40° C. to 110° C. of the voice coil temperature Tvc. Therefore, as indicated by the dashed lines L1, L2, and L3 in FIG. 6, when the voltage level of the sound generation signal Sm is not changed in accordance with the temperature change, the sound pressure level of the approach notification sound actually output from the speaker 20 decreases in accordance with the temperature rise. For example, when the voice coil temperature Tvc has a width of 150° C. in case where the voice coil temperature Tvc changes from −40 to 110° C., the sound pressure level simply decreases by 4 dB only due to the influence of the temperature change.

Specifically, since the resistance value of the voice coil 205 of the speaker 20 is different among individual voice coils 205, the temperature characteristic shown in FIG. 5 varies among the individual speakers 20. Therefore, the sound pressure level temperature characteristic of the speaker 20 also varies among the individual speakers 20, for example, as indicated by the dashed lines L1, L2, and L3 in FIG. 6.

The dashed line L1 in FIG. 6 indicates a sound pressure level temperature characteristic as individual data obtained by measuring the first individual of the speaker 20, that is, a first sound pressure level temperature characteristic. The dashed line L2 indicates a sound pressure level temperature characteristic as individual data obtained by measuring the second individual of the speaker 20, that is, a second sound pressure level temperature characteristic. The dashed line L3 indicates a sound pressure level temperature characteristic as individual data obtained by measuring the third individual of the speaker 20, that is, a third sound pressure level temperature characteristic. The first to third individuals of the speaker 20 are respectively provided in the separate proximity alarm devices 10.

The first sound pressure level temperature characteristic is stored in advance in the memory unit 32a of the microcomputer 32, which is included in the proximity alarm device 10 having the first individual speaker 20. Similarly, the second sound pressure level temperature characteristic is stored in advance in the memory unit 32*a* of the microcomputer 32, which is included in the proximity alarm device 10 having the second individual speaker 20. The third sound pressure level temperature characteristic is stored in advance in the memory unit 32*a* of the microcomputer 32, which is included in the proximity alarm device 10 having the third individual speaker 20.

The first to third sound pressure level temperature characteristics, which are individual data stored in the memory unit 32*a*, are correction data used to correct the approach notification sound.

In the present embodiment, the speaker 20 has, for example, the sound pressure level temperature characteristics indicated by the dashed line L1, L2, or L3 in FIG. 6, and the correcting unit 32*e* calculates the amplitude coefficient k1 according to the speaker temperature. Then, by multiplying the amplitude coefficient k1 by the sound generation signal Sm before the sound pressure correction, the sound pressure level of the sound generation in the speaker 20 can be corrected. When the approach notification sound is generated from the speaker 20, the sound pressure level can be set to a constant value, for example, as indicated by a solid line L0 in FIG. 6. The solid line L0 in FIG. 6 indicates a sound pressure level Y0 targeted for correction, that is, a target sound pressure level Y0. The target sound pressure level Y0 is experimentally determined in advance as a value that satisfies both the notifying performance and the noise performance of the approach notification sound.

Specifically, the voltage level of the sound generation signal Sm is corrected by increasing the amplitude coefficient k1 as the speaker temperature increases.

For example, a case where the voice coil temperature Tvc, which is the estimated and calculated speaker temperature, is the temperature T1 in the proximity alarm device 10 including the first individual speaker 20 will be described. In this case, in order to calculate the amplitude coefficient k1, the correcting unit 32*e* uses the first sound pressure level temperature characteristic indicated by the dashed line L1 in FIG. 6, and obtains the sound pressure level Y1 corresponding to the temperature T1 by the first sound pressure level temperature characteristic (that is, the relationship of the dashed line L1). Then, the correcting unit 32*e* determines the amplitude coefficient k1 so that the sound pressure level Y1 becomes the target sound pressure level Y0. In this case, as indicated by the arrow AR1, the sound pressure level needs to be raised by the correction, so that the amplitude coefficient k1 becomes "k1>1". By setting the amplitude coefficient k1 to "k1>1", the voltage level of the sound generation signal Sm is increased as compared with the case of "k1=1".

In addition, as another example, a case where the voice coil temperature Tvc which is the estimated and calculated speaker temperature is the temperature T2 in the proximity alarm device 10 including the second individual speaker 20 will be described. In this case, in order to calculate the amplitude coefficient k1, the correcting unit 32*e* uses the second sound pressure level temperature characteristic indicated by the dashed line L2 in FIG. 6 and obtains the sound pressure level Y2 corresponding to the temperature T2 with the second sound pressure level temperature characteristic (that is, the relationship of the dashed line L2). Then, the correcting unit 32*e* determines the amplitude coefficient k1 so that the sound pressure level Y2 becomes the target sound pressure level Y0. In this case, since the sound pressure level needs to be lowered by the correction as indicated by the arrow AR2, the amplitude coefficient k1 becomes "k1<1". By setting the amplitude coefficient k1 to "k1<1", the voltage level of the sound generation signal Sm is lowered as compared with the case of "k1=1".

In this manner, the correcting unit 32*e* corrects the voltage level of the sound generation signal Sm so as to absorb the variation in the sound pressure level temperature characteristic among the individual speakers 20 and to make the sound pressure level of the sound generation in the speaker 20 a constant value as indicated by the solid line L0 in FIG. 6 regardless of the speaker temperature.

In the present embodiment, the sound pressure level of sound emission from the speaker 20 is set to a constant value, but the constant value does not necessarily have to be exactly the same fixed sound pressure level. The target constant value for correcting the sound pressure level may be a value having a certain width, for example, a value having a width such that a change in the sound pressure level in the operating temperature range of the proximity alarm device 10 is within a predetermined range of about 2 dB.

The correcting unit 32*e* corrects the frequency of the sound generation signal Sm according to the speaker temperature. In general, the characteristics of the sound source data used as the approach notification sound (hereinafter, referred to as a sound source characteristic) are set in accordance with the frequency characteristics of the speaker 20 (hereinafter, referred to as a speaker frequency characteristic). Therefore, a change in the speaker frequency characteristics may cause an unintended sound pressure fluctuation or a change in tone. The speaker frequency characteristic varies depending on a hardness change based on a temperature change of the diaphragm 202 (see FIG. 2) included in the speaker 20. Therefore, the correcting unit 32*e* of the present embodiment performs correction by finely adjusting the pitch of the approach notification sound in accordance with the amount of change in the speaker frequency characteristic in response to the change in the speaker frequency characteristic due to the change in the speaker temperature. The correcting unit 32*e* performs the correction of finely adjusting the pitch of the approach notification sound in combination with the correction of the amplitude of the sound pressure corresponding to the speaker temperature.

Figure 7:
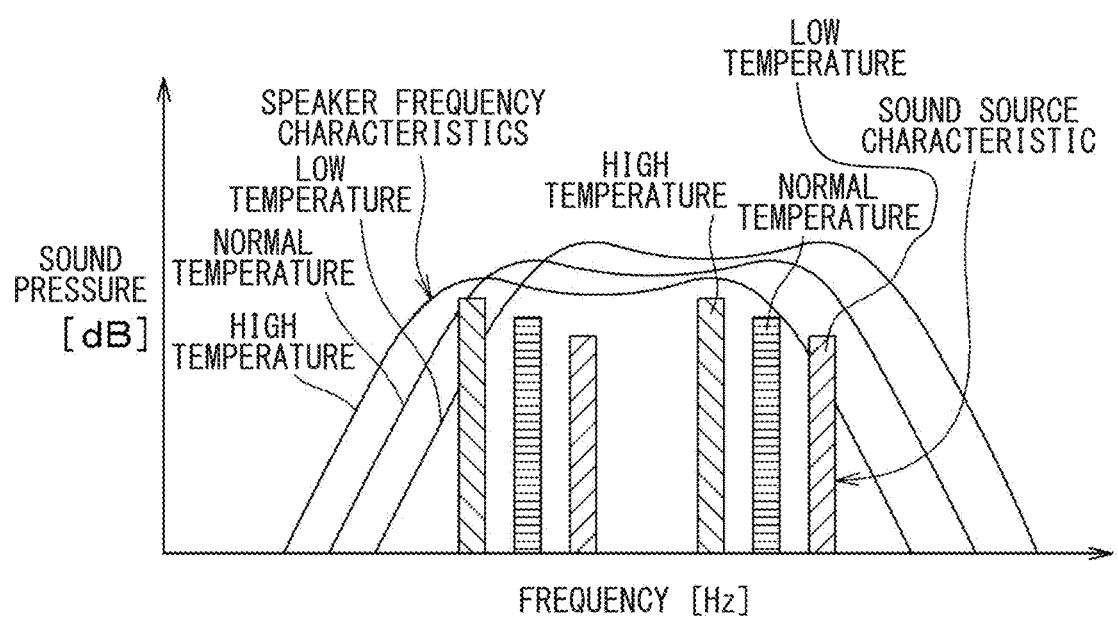
FIG. 7 is a diagram illustrating speaker frequency characteristics and sound source characteristic in the first embodiment.

For example, as illustrated in FIG. 7, the speaker frequency characteristics and the sound source characteristics vary depending on a change in speaker temperature, more specifically, a change in hardness based on a change in temperature of the diaphragm 202 of the speaker 20. That is, since the resonance frequency of the diaphragm 202 is determined by the hardness of the diaphragm 202, the resonance frequency changes in accordance with the hardness change caused by the temperature change of the diaphragm 202, and the speaker frequency characteristic and the sound source characteristic change. The speaker frequency characteristic is represented by a mountain-curved waveform, and the frequency at which the peak occurs changes depending on the speaker temperature, which is low, normal (for example, about 25° C.), or high. The lower the speaker temperature is, the higher the frequency at which the peak occurs is. Regarding the sound source characteristics, changes are shown in efficiency with respect to load (in other words, efficiency with respect to time) of two typical components in each of a low frequency band and a high frequency band in a frequency band used as a sound source. The efficiency changes in each of the cases where the speaker temperature is low, normal, and high, and the efficiency decreases as the speaker temperature increases.

Therefore, the correcting unit 32*e* corrects the frequency of the approach notification sound based on the speaker temperature, and finely adjusts the pitch. For example, when the speaker temperature is higher than room temperature, the correcting unit 32e lowers the frequency of the approach notification sound to be lower than that at room temperature. When the speaker temperature is lower than room temperature, the correcting unit raises the frequency of the approach notification sound to be higher than that at room temperature, and corrects the speaker frequency characteristics to be close to those at room temperature. The correcting unit 32e changes the sound pressure of each component in the frequency band used as the approach notification sound based on the speaker temperature. For example, the correcting unit 32e increases the sound pressure of the frequency component of the approach notification sound when the speaker temperature is higher than room temperature, and decreases the sound pressure of the frequency component of the approach notification sound when the speaker temperature is lower than room temperature, so that the sound source characteristics approach those at room temperature. As a result, even when the speaker temperature changes, the change in the audible approach notification sound can be reduced.

As described above, the correcting unit 32e corrects the amplitude and frequency of the sound pressure of the approach notification sound according to the speaker sound. As a result, it is possible to reduce the change in the audible approach notification sound even when the speaker temperature changes.

Next, a method of estimating and calculating the speaker temperature by the arithmetic unit 32d will be described. The speaker temperature is estimated by estimating the ambient temperature Tsp around the speaker 20 (hereinafter, referred to as a speaker atmosphere temperature Tsp) and estimating the temperature rise of the voice coil 205 (see FIG. 2) of the speaker 20. Specifically, the arithmetic unit 32d estimates the speaker ambient temperature Tsp, and obtains the speaker temperature by estimating the temperature rise of the voice coil 205 based on the estimated speaker ambient temperature Tsp.

The speaker ambient temperature Tsp, in other words, the ambient temperature of the voice coil 205, is increased by the energized voice coil 205, the electric board 30, and the electrical components on the electric board 30. In addition, the speaker ambient temperature Tsp is increased by an in-vehicle device as a heat source such as an engine or a radiator disposed in the engine room 71.

The arithmetic unit 32d estimates the speaker ambient temperature Tsp on the basis of the outside air temperature information, the water temperature information, the oil temperature information, the board temperature information, and the vehicle speed information acquired by the acquisition unit 32c from the external connection device 72 and the board temperature sensor 36. Specifically, the arithmetic unit 32d estimates the speaker ambient temperature Tsp using the following formula F1 as a predetermined rule for obtaining the speaker ambient temperature Tsp.

$$Tsp = a1 \cdot Tair + b1 \cdot Tra + c1 \cdot Toil + d1 \cdot Tpcb - k2 \cdot SPD \quad (F1)$$

In the formula F1, Tsp denotes a speaker ambient temperature, Tair denotes outside air temperature information, a1 denotes an outside air temperature coefficient, Tra denotes water temperature information, b1 denotes a water temperature coefficient, Toil denotes oil temperature information, c1 denotes an oil temperature coefficient, Tpcb denotes board temperature information, d1 denotes a board temperature coefficient, SPD denotes vehicle speed information, and k2 denotes a natural air cooling coefficient with respect to vehicle speed.

Regarding the formula F1, the coefficients a1, b1, c1, d1, and k2 of the formula F1 are experimentally determined in advance. For example, the correlation between the speaker ambient temperature Tsp at the mounting position of the speaker 20 and the temperature information of the outside air temperature, the water temperature, the oil temperature, and the board temperature that can be acquired from the sensors 721 to 724 and 36 is measured in advance, and the coefficients a1, b1, c1, and d1 are determined based on the measured correlation.

In addition, in the formula F1, it is taken into consideration that natural air cooling of the speaker 20 occurs due to wind contact of the air flow at the speaker mounting position during traveling of the vehicle. Therefore, the term "−k2·SPD" is provided on the right side of the formula F1. The natural cooling of the speaker 20 is considered to be proportional to the vehicle speed, and the natural air cooling coefficient k2 of the formula F1 is determined based on the degree of influence of the vehicle speed by the speaker mounting position experimentally obtained in advance. Since the vehicle speed acts in a direction in which the speaker ambient temperature Tsp decreases as the vehicle speed increases, the speaker ambient temperature Tsp is calculated by subtracting a value obtained by multiplying the vehicle speed information by the natural air cooling coefficient k2 from a total of values obtained by multiplying the respective pieces of temperature information by coefficients. The coefficients a1, b1, c1, d1, and k2 in the formula F1 are different, for example, when the configuration of the engine room 71 of the vehicle 70 or the arrangement of the in-vehicle equipment is different.

More specifically, since the board temperature sensor 36 that detects the board temperature is disposed in the vicinity of the speaker 20, the board temperature most strongly affects the speaker ambient temperature Tsp among the outside air temperature, the water temperature of the radiator water, the oil temperature of the engine oil, the board temperature, and the vehicle speed. Therefore, in the formula F1, the degree of contribution of the board temperature information to the speaker ambient temperature Tsp is the largest among the degrees of contribution of the outside air temperature information, the water temperature information, the oil temperature information, the board temperature information, and the vehicle speed information to the speaker ambient temperature Tsp. For example, when the speaker ambient temperature Tsp increases, the speaker temperature increases accordingly. In other words, it can be said that the degree of contribution of the board temperature information to the speaker temperature is the largest among the degrees of contribution of the outside air temperature information, the water temperature information, the oil temperature information, the board temperature information, and the vehicle speed information to the speaker temperature.

Specifically, in the formula F1, the degree of contribution to the speaker ambient temperature Tsp is adjusted by the coefficients a1, b1, c1, d1, and k2. For example, if Tair, Tra, Toil, Tpcb, and SPD, which are parameters of the formula F1, vary within the same variation range, the contribution of the board temperature information to the speaker ambient temperature Tsp can be maximized by maximizing the board temperature coefficient d1 among the coefficients a1, b1, c1, d1, and k2.

The degree of contribution to the speaker ambient temperature Tsp is the degree of influence on the variation of the speaker ambient temperature Tsp estimated and calculated by the arithmetic unit 32d. The degree of contribution to the speaker temperature is similarly defined. That is, the degree of contribution to the speaker temperature is the degree of influence on the fluctuation of the speaker temperature estimated and calculated by the arithmetic unit 32d.

The rise in temperature of the voice coil 205 (see FIG. 2) is estimated and calculated from the output time while the sound is generated by the speaker 20, the elapsed time after the sound generation is stopped, and the output rate of the speaker 20. The unit of the output rate of the speaker 20 is, for example, "%".

Since the sound output waveform set as the approach notification sound repeatedly reproduces a constant tone, the approach notification sound can be regarded as a standing wave. Since the heat loss at the time of sound generation is proportional to the product obtained by multiplying the output waveform, the output amplitude, and the output time of the approach notification sound, that is, the square of the integral value of the output voltage, it is possible to estimate the position on the temperature increase curve or the temperature decrease curve shown in FIG. 8 by the sum of the heat loss occurring in the voice coil 205 and the speaker ambient temperature Tsp estimated as described above.

For example, the temperature increase curve is represented by the following formula F2.

$$Tvc = a2\left(1 - e^{-\frac{1}{\tau}t}\right) + Tsp \quad (F2)$$

($a2$: positive constant, $\tau$: positive constant)

In the formula F2, Tvc is the voice coil temperature, a2 is an asymptote of the temperature increase curve, T is a time constant, and t is the output time of the speaker 20. The asymptote a2 is proportional to the heat loss during sound generation, and the time constant T depends on the heat dissipation. The asymptote a2 and the time constant T can be obtained in advance by actual measurement or calculation. The temperature decrease curve is determined based on the temperature difference between the voice coil temperature Tvc and the speaker ambient temperature Tsp when the sound generation is stopped, the elapsed time after the sound generation is stopped, the material of the voice coil 205, and the like.

Therefore, during the sound emission of the speaker 20, the voice coil temperature Tvc can be estimated and calculated by adding the temperature increase amount based on the temperature increase curve to the speaker ambient temperature Tsp. While the speaker 20 stops the sound emission, the voice coil temperature Tvc can be estimated and calculated by subtracting the temperature decrease amount based on the temperature decrease curve from the estimated voice coil temperature Tvc at the time when the sound emission is stopped.

The arithmetic unit 32d performs the estimation calculation of the voice coil temperature Tvc by integrating the addition of the temperature increase amount and the subtraction of the temperature decrease amount in consideration of the output time of the approach notification sound in the travelable state of the vehicle 70 and the elapsed time from the stop of the sound generation. Accordingly, the speaker temperature can be accurately calculated in accordance with the temperature change of the voice coil 205 from the start of the vehicle 70.

The output rate of the speaker 20, that is, the ratio of the actual output can be set according to the vehicle speed or the like, relative to the maximum output where the output rate with respect to the sound pressure level of the approach notification sound is 100%. Specifically, the output of the approach notification sound can be set such that the output rate is low when the vehicle speed is low, and such that the output rate is high when the vehicle speed is high. In this case, since the asymptote a2 of the temperature increase curve changes according to the output rate, the temperature increase curve corresponding to the change in the output rate can be obtained by multiplying the asymptote a2 by the output rate.

As described above, the microcomputer 32 included in the proximity alarm device 10 of the present embodiment corrects the sound pressure of the approach notification sound, for example, the voltage level of the sound generation signal Sm according to the speaker temperature, and corrects the frequency of the approach notification sound and the sound pressure of each component in the frequency band used as the approach notification sound. With this correction, a change in the approach notification sound caused by a change in the speaker temperature can be suppressed as compared with a case where the correction of the approach notification sound by the correcting unit 32e is not performed.

As described above, according to the present embodiment, as shown in FIGS. 2 and 4, the microcomputer 32, the speaker 20, the electric board 30, and the board temperature sensor 36 are housed in the housing 11 of the proximity alarm device 10. The board temperature sensor 36 is mounted on the other surface 302 serving as a sensor mounting surface of the electric board 30, detects a board temperature which is a temperature on the other surface 302, and outputs board temperature information indicating the board temperature to the microcomputer 32. Then, the arithmetic unit 32d of the microcomputer 32 estimates and calculates the speaker temperature based on the board temperature information, and the correcting unit 32e corrects the approach notification sound based on the speaker temperature estimated and calculated by the arithmetic unit 32d.

Therefore, the board temperature sensor 36 to detect the board temperature for estimating and calculating the speaker temperature can be disposed in the space inside the housing 11, which is the same space as the speaker 20, and can be disposed in the vicinity of the speaker 20. Therefore, it is possible to improve the estimation accuracy of the speaker temperature in comparison with, for example, a vehicle proximity alarm device that does not use a temperature in the vicinity of the speaker for estimating and calculating the speaker temperature.

In addition, since the board temperature sensor 36 is mounted on the electric board 30 on which the microcomputer 32 is mounted, electric wiring for connecting the board temperature sensor 36 and the electric board 30 on which the microcomputer 32 is mounted is not necessary. Therefore, compared to a case where the detection signal of the board temperature sensor 36 is input to the microcomputer 32 via the electric wiring, the electric resistance between the board temperature sensor 36 and the microcomputer 32 can be significantly reduced, and the detection signal of the board temperature sensor 36 can be accurately input to the microcomputer 32. From this point, it is also possible to improve the estimation accuracy of the speaker temperature.

In addition, in a configuration in which the electric board 30 on which the microcomputer 32 is mounted and the speaker 20 are integrally mechanically and electrically housed in one housing 11, it is easy to provide the board temperature sensor 36 on the electric board 30 in the housing 11. That is, it is possible to easily improve the estimation accuracy of the speaker temperature by using the board temperature information obtained from the board temperature sensor 36.

According to the present embodiment, as shown in FIGS. 4 and 6, the sound pressure level temperature characteristic as the individual data is measured for each individual speaker 20. The memory unit 32a of the microcomputer 32 included in the one product of the proximity alarm device 10 stores in advance the sound pressure level temperature characteristic obtained by measuring the individual speaker 20 included in the one product of the proximity alarm device 10. Then, the correcting unit 32e of the microcomputer 32 corrects the approach notification sound using the sound pressure level temperature characteristic as the individual data.

Therefore, it is possible to simultaneously perform the individual variation correction for absorbing the variation of the sound pressure level temperature characteristic for each individual speaker 20 and the temperature correction according to the speaker temperature. As a result, it is possible to suppress variation in the approach notification sound emitted from the speaker 20 with high accuracy.

In addition, since the microcomputer 32 and the speaker 20 are mechanically and electrically integrated so as to constitute a single unit, there is no concern that a combination of individual data stored in the memory unit 32a of the microcomputer 32 and the speaker 20 having a one-to-one relationship with the individual data is shifted.

According to the present embodiment, as shown in FIG. 2, the drive unit 203 of the speaker 20 is disposed at one side of the diaphragm 202 in the speaker axial direction Da. The electric board 30 is disposed at one side in the speaker axial direction Da with respect to the drive unit 203, and has a plate shape extending in a direction intersecting the speaker axial direction Da. The board temperature sensor 36 is disposed so as to overlap the drive unit 203 of the speaker 20 at one side in the speaker axial direction Da.

Therefore, while the board temperature sensor 36 is mounted on the electric board 30 on which the microcomputer 32 is mounted, the board temperature sensor 36 can be disposed in the vicinity of the voice coil 205 included in the drive unit 203 of the speaker 20. Accordingly, it is possible to accurately estimate and calculate the speaker temperature obtained based on the board temperature detected by the board temperature sensor 36.

According to the present embodiment, as shown in FIG. 2, the other surface 302 of the electric board 30 is a sensor mounting surface on which the board temperature sensor 36 is mounted, and is a surface facing the other side in the speaker axial direction Da.

Therefore, compared to a case where the board temperature sensor 36 is mounted on the one surface 301 of the electric board 30 instead of the other surface 302, the board temperature sensor 36 can be disposed close to the voice coil 205 of the speaker 20. In addition, the board temperature sensor 36 can be disposed so that the electric board 30 does not block between the board temperature sensor 36 and the voice coil 205. Accordingly, the board temperature detected by the board temperature sensor 36 can be brought close to the temperature around the voice coil 205.

According to the present embodiment, as shown in FIG. 4, the vehicle speed information, the water temperature information, the oil temperature information, and the outside air temperature information corresponding to the engine room temperature related information related to the temperature of the engine room 71 are input to the microcomputer 32. Then, the arithmetic unit 32d of the microcomputer 32 estimates and calculates the speaker temperature based on the engine room temperature related information and the board temperature information.

Here, the proximity alarm device 10 of the present embodiment is disposed in the engine room 71 of the vehicle 70, and the temperature change in the engine room 71 is severe. Therefore, in the present embodiment, there is a specific situation in which the relationship between the board temperature and the speaker ambient temperature Tsp is likely to fluctuate due to the influence of the temperature change in the engine room 71, as compared with a case where the proximity alarm device 10 is placed in an environment in which the ambient temperature change is gentle.

In view of such specific circumstances, the speaker temperature is estimated and calculated in consideration of not only the board temperature information but also the engine room temperature related information. Therefore, it is possible to estimate and obtain an accurate speaker temperature in consideration of the temperature in the engine room 71.

Although the board temperature is affected by the self-heating of the electric board 30 due to the energization, the influence of the self-heating of the electric board 30 on the speaker temperature obtained by the estimation calculation can be reduced by adding the engine room temperature related information to the estimation calculation of the speaker temperature.

In addition, according to the present embodiment, as illustrated in FIG. 4, the arithmetic unit 32d estimates the speaker ambient temperature Tsp using the formula F1 as a predetermined rule for obtaining the speaker ambient temperature Tsp. Then, the arithmetic unit 32d estimates and calculates the speaker temperature based on the speaker ambient temperature Tsp. Furthermore, the formula F1 is defined such that the degree of contribution of the board temperature information to the speaker ambient temperature Tsp is the largest among the degrees of contribution of the outside air temperature information, the water temperature information, the oil temperature information, the board temperature information, and the vehicle speed information to the speaker ambient temperature Tsp.

Since the board temperature sensor 36 is disposed in the vicinity of the speaker 20, there is an actual situation that the change in the speaker ambient temperature Tsp is most strongly reflected in the board temperature among the physical quantities indicated by the respective pieces of information employed in the formula F1. Since the formula F1 is set in accordance with the actual situation, the speaker ambient temperature Tsp can be accurately estimated by the formula F1. By improving the estimation accuracy of the speaker ambient temperature Tsp, it is possible to accurately estimate and obtain the speaker temperature.

Other Embodiment (1) In the first embodiment, as illustrated in FIG. 4, the outside air temperature information acquired by the microcomputer 32 from the outside air temperature sensor 724 is an outside air temperature detection signal output from the outside air temperature sensor 724, and is represented by, for example, a voltage. However, this is an example. The outside air temperature information acquired by the microcomputer 32 may be the outside air temperature itself, which is a physical quantity, or may be an index value other than a voltage indicating the outside air temperature. The same applies to the information of the physical quantity acquired by the microcomputer 32 from the sensors 721, 722, 723, and 36 other than the outside air temperature sensor 724.

(2) In the first embodiment, as illustrated in FIG. 4, the detection signal of the sensors 721 to 724 is input to the microcomputer 32, and thus the microcomputer 32 acquires the vehicle speed information and the temperature information. For example, instead of the input of the detection signal of the sensors 721 to 724, vehicle speed information and temperature information handled in various electronic control units (in other words, ECU) provided in the vehicle 70 may be input to the microcomputer 32, and the microcomputer 32 may thereby acquire the vehicle speed information and the temperature information.

For example, in the meter control ECU, since the vehicle speed detection signal of the vehicle speed sensor 721 is input and the vehicle speed is acquired, the vehicle speed information may be input from the meter control ECU to the microcomputer 32. In the engine ECU 725, the temperatures of the radiator water and the engine oil are acquired based on the detection signals of the water temperature sensor 722 and the oil temperature sensor 723. Therefore, the water temperature information and the oil temperature information may be input from the engine ECU 725 to the microcomputer 32. Since an ECU for controlling the vehicle air conditioner acquires the outside air temperature based on the detection signal of the outside air temperature sensor 724, the outside air temperature information may be input to the microcomputer 32 from the ECU for controlling the vehicle air conditioner.

(3) In the first embodiment, FIG. 4 illustrates the memory unit 32a, the signal generating unit 32b, the acquisition unit 32c, the arithmetic unit 32d, the correcting unit 32e, and the output time arithmetic unit 32f included in the microcomputer 32 as functional components independent of each other, but this is an example. Two or more of these functional components may be integrated into one functional component. For example, the arithmetic unit 32d may be configured to include the acquisition unit 32c.

(4) In the first embodiment, the arithmetic unit 32d of FIG. 4 estimates the speaker ambient temperature Tsp by using the formula F1 as a predetermined rule for obtaining the speaker ambient temperature Tsp, but this is an example. For example, the arithmetic unit 32d may estimate the speaker ambient temperature Tsp by using a map experimentally determined in advance using the outside air temperature information, the water temperature information, the oil temperature information, the board temperature information, and the vehicle speed information as parameters, instead of the formula F1. In this case, the map corresponds to the predetermined rule.

(5) In the first embodiment, the sound pressure level of the approach notification sound when actually emitted by the speaker 20 is set to a fixed value or within a predetermined range. However, in addition to the vehicle speed, the output rate of the sound pressure level of the approach notification sound may be changed according to the vehicle traveling state such as the accelerator opening degree. For example, by increasing the output rate of the sound pressure level of the approach notification sound as the vehicle speed or the accelerator opening degree increases, it is possible to cause the pedestrian to recognize that the approach of the vehicle 70 is faster or the acceleration amount of the vehicle 70 is larger.

In such a case, basically, the vehicle state and the output rate with respect to the sound pressure level of the approach notification sound have a constant relationship, but when the speaker temperature changes, the relationship is also changed. Therefore, also in this case, when the amplitude coefficient k1 of the sound generation signal Sm is calculated based on the speaker temperature and the sound generation signal Sm is corrected, the vehicle state and the output rate with respect to the sound pressure level of the approach notification sound can be made to have a constant relationship.

Similarly, the frequency of the approach notification sound and the frequency band to be used can also be changed according to the vehicle traveling state such as the vehicle speed and the accelerator opening degree. Even in this case, when the frequency of the approach notification sound set according to the vehicle traveling state and the frequency band to be used are changed according to the speaker temperature, the effects described in the first embodiment can be obtained.

(6) In the first embodiment, as shown in FIG. 4, the sound generation signal Sm itself output from the microcomputer 32 is already a corrected signal, but this is an example. The voltage level and the frequency of the sound generation signal Sm and the sound pressure of the frequency component in the frequency band to be used can be corrected outside the microcomputer 32. For example, a voltage control unit is provided outside the microcomputer 32, the sound generation signal Sm before correction is input to the voltage control unit, and a control signal corresponding to the amplitude coefficient k1 and the correction amount of the frequency component in the frequency band is output from the microcomputer 32. In this way, the voltage control unit can correct the voltage level of the sound generation signal Sm and the like based on the control signal, and the same effect as that of the first embodiment can be obtained.

(7) In the first embodiment, as illustrated in FIG. 1, the vehicle 70 on which the proximity alarm device 10 is mounted is, for example, a hybrid vehicle, but the vehicle 70 may be an electric vehicle.

(8) The present disclosure is not limited to the above embodiment, and can be implemented in various modifications. Moreover, it goes without saying that the components included in the embodiment are not necessarily required unless specified as being required, regarded as being clearly required in principle, or the like.

The numerical value such as the number, the numerical value, the quantity, the range, or the like of a component mentioned in the above embodiment is not limited to a specific number unless specified as being required, clearly limited to such a specific number in principle, or the like. The material, the shape, the positional relationship, and the like of a component or the like mentioned in the above embodiment are not limited to those being mentioned unless otherwise specified, limited to specific material, shape, positional relationship, and the like in principle, or the like.

In the above embodiment, when it is described that outside environment information (for example, outside air temperature) of a vehicle 70 is acquired from a sensor, the sensor may be abolished and the outside environment information may be received from a server or the cloud outside the vehicle 70. Alternatively, it is also possible to eliminate the sensor, acquire related information related to the external environmental information from a server or a cloud outside the vehicle 70, and estimate the external environmental information from the acquired related information.

What is claimed is:

1. A proximity alarm device configured to emit an approach notification sound to notify an approach of a vehicle, comprising:
    a microcomputer having a memory unit storing approach notification sound data which is a basis of the approach notification sound and performing output based on the approach notification sound data;
    a sounding body configured to emit the approach notification sound based on an output from the microcomputer;
    an electric board on which the microcomputer is mounted;
    a board temperature sensor mounted on a sensor mounting surface of the electric board to detect a board temperature which is a temperature on the sensor mounting surface and output board temperature information indicating the board temperature to the microcomputer; and
    a housing in which the microcomputer, the sounding body, the electric board, and the board temperature sensor are housed, wherein
    in addition to the memory unit, the microcomputer further includes: an arithmetic unit configured to estimate and calculate a sounding body temperature, which is a temperature of the sounding body, based on the board temperature information; and a correcting unit configured to correct the approach notification sound based on the sounding body temperature estimated and calculated by the arithmetic unit.

2. The proximity alarm device according to claim 1, wherein
    the memory unit stores individual data, in advance, obtained by measuring individuals of the sounding body of the proximity alarm device, and
    the correcting unit is configured to correct the approach notification sound using the individual data.

3. The proximity alarm device according to claim 1, wherein
    the sounding body includes a diaphragm and a drive unit that vibrates the diaphragm by being energized,
    the drive unit is disposed at one side of the diaphragm in an axial direction of an axis of the diaphragm,
    the electric board is disposed at the one side of the drive unit in the axial direction, and spreads in a direction intersecting the axial direction, and
    the board temperature sensor is disposed to overlap the drive unit at the one side in the axial direction.

4. The proximity alarm device according to claim 3, wherein the sensor mounting surface faces the other side opposite to the one side in the axial direction.

5. The proximity alarm device according to claim 1, which is arranged in a power source chamber housing a power source of the vehicle, wherein
    the microcomputer is configured to receive at least one piece of power source chamber temperature related information related to a temperature of the power source chamber, and
    the arithmetic unit is configured to estimate and calculate the sounding body temperature based on the power source chamber temperature related information and the board temperature information.

6. The proximity alarm device according to claim 5, wherein
    the arithmetic unit is configured to estimate and calculate the sounding body temperature by using a rule determined in advance such that a degree of contribution of the board temperature information to the sounding body temperature is a largest, among degrees of contribution of the at least one piece of power source chamber temperature related information to the sounding body temperature, and
    the degree of contribution to the sounding body temperature is a degree of influence on a variation in the sounding body temperature estimated and calculated by the arithmetic unit.

* * * * *